United States Patent
Sortore et al.

(10) Patent No.: US 7,250,704 B1
(45) Date of Patent: Jul. 31, 2007

(54) HIGH TEMPERATURE ELECTRICAL COIL

(75) Inventors: Christopher K. Sortore, Roanoke, VA (US); Victor Iannello, Roanoke, VA (US); Robert Jett Field, Fincastle, VA (US)

(73) Assignee: Synchrony, Inc., Roanoke, VA (US)

( * ) Notice: Subject to any disclaimer, the term of this patent is extended or adjusted under 35 U.S.C. 154(b) by 309 days.

(21) Appl. No.: 10/912,955

(22) Filed: Aug. 6, 2004

Related U.S. Application Data (60) Provisional application No. 60/492,944, filed on Aug. 6, 2003.

(51) Int. Cl.
*H02K 3/00* (2006.01)
*H02K 13/00* (2006.01)
*H02K 15/00* (2006.01)
*H01F 27/00* (2006.01)

(52) U.S. Cl. .............. 310/208; 310/85; 336/223; 336/232

(58) Field of Classification Search .......... 310/203, 310/206, 208, 85; 335/216, 300, DIG. 1; 336/83, 200, 206, 223, 232, 234
See application file for complete search history.

(56) References Cited

U.S. PATENT DOCUMENTS

| 3,146,300 | A | * | 8/1964 | Beckius et al. ............. 174/127 |
| 4,270,936 | A | * | 6/1981 | Mann .......................... 55/520 |
| 4,286,010 | A | * | 8/1981 | Staley et al. ................ 428/215 |
| 4,962,085 | A | * | 10/1990 | deBarbadillo et al. ...... 505/500 |
| 6,040,650 | A | * | 3/2000 | Rao ............................. 310/268 |
| 6,489,701 | B1 | | 12/2002 | Gamble et al. |
| 2002/0029897 | A1 | | 3/2002 | Younsi |
| 2002/0176943 | A1 | * | 11/2002 | Pereira et al. ............ 427/376.2 |

* cited by examiner

*Primary Examiner*—Tran Nguyen
(74) *Attorney, Agent, or Firm*—Michael Haynes PLC; Michael N. Haynes; Dale Jensen (57) ABSTRACT

Certain exemplary embodiments can provide an electrical coil for an electromagnetic machine, said coil comprising: a first electrically conductive winding wound about a central axis in a first spiral, said first winding defining a first winding width and a first winding thickness; a first electrically insulating tape wound about the central axis in a second spiral, said first tape defining a first tape width and a first tape thickness, said first tape located width-wise adjacent said first winding; and a corrosion-resistant shell encasing said first spiral and said second spiral.

24 Claims, 7 Drawing Sheets

HIGH TEMPERATURE ELECTRICAL COIL

CROSS-REFERENCES TO RELATED APPLICATIONS

This application claims priority to, and incorporates by reference herein in its entirety, pending U.S. Provisional Patent Application Ser. No. 60/492,944, filed 6 Aug. 2003.

BRIEF DESCRIPTION OF THE DRAWINGS

The invention and its wide variety of potential embodiments will be more readily understood through the following detailed description, with reference to the accompanying drawings in which.

DEFINITIONS

When the following terms are used herein, the accompanying definitions apply:

coil—a continuous loop comprising two or more turns of electrically conductive material.

comprising—including but not limited to.

continuous operating temperature—a temperature in, at, and/or above which a device is normally operated in a continuous manner for a sustained length of time of at least 10 minutes.

corrosion-resistant—exhibiting substantial resistance to corrosion in a predetermined operating environment.

electrically conductive—having the quality or power of substantially conducting electricity;

electrically insulating—having the quality or power of substantially resisting the conduction of electricity;

electromagnetic machine—a device that utilizes and/or produces magnetism that is developed by the passage of an electric current.

high temperature—a temperature exceeding at least 900 degrees F.

magnetic field—a the portion of space near a magnetic body or a current-carrying body in which the magnetic forces due to the body or current can be detected.

magnetomotive force—a force that produces magnetic flux.

phase—a number of portions of a complete rotational cycle of a machine. Also, a fraction of a complete cycle elapsed as measured from a specified reference point and often expressed as an angle.

pole—one of two or more regions in a magnetized body at which the magnetic flux density is concentrated.

rotor—a rotating portion of a machine.

shell—a hard external protective case or cover.

spiral—a path of a point in a plane moving around a central point while, on average, receding from or approaching it. When considering a spiral that generally recedes from the central point, for a given rotation about the central point, the spiral need not have a continuously increasing radius from the central point, however, each successive turn will have an increasing radius. Thus, a portion of a spiral can be linear and/or curvilinear.

stator—a stationary portion of a machine.

subgroup—a portion of a plurality.

switched reluctance machine—a rotating electric machine where both stator and rotor have salient poles and lack permanent magnets. Each stator pole comprises at least one coil. The stator poles are arranged in phases, the corresponding coils for which are electronically switched to produce a moving magnetic field, which the rotor follows in synchronism.

system—a collection of devices and/or instructions, the collection designed to perform one or more specific functions.

width-wise adjacent—at least two items located adjacent one another along respective sides that are characterized by one or more widths of the items.

winding—something wound about a central point and/or axis.

DETAILED DESCRIPTION

High temperature electrical coils can be utilized for electrical machines and/or devices such as motors, generators, and/or magnetic bearings that operate in high temperature environments. Applications include electrical machines and devices that are internal or proximate to internal combustion engines, turbines, furnaces, and/or hot mills, etc.

Certain exemplary embodiments of a high temperature coil described herein can be used in continuous service at temperatures above about 1000° F.

Certain exemplary embodiments can provide an electrical coil for an electromagnetic machine, said coil comprising: a first electrically conductive winding wound about a central axis in a first spiral, said first winding defining a first winding width and a first winding thickness; a first electrically insulating tape wound about the central axis in a second spiral, said first tape defining a first tape width and a first tape thickness, said first tape located width-wise adjacent said first winding; and a corrosion-resistant shell encasing said first spiral and said second spiral.

Figure 1:
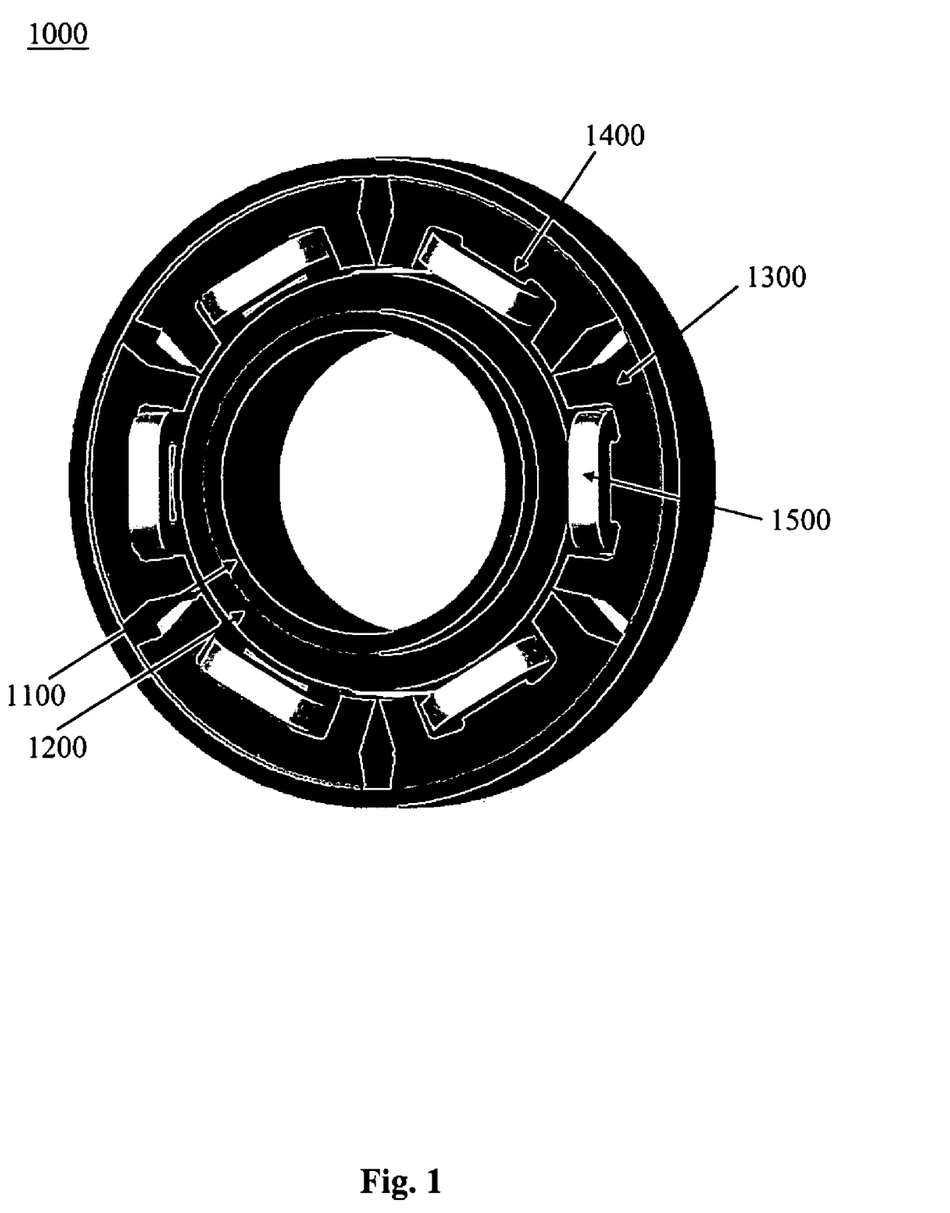
FIG. 1 is a front perspective view of an exemplary embodiment of a machine 1000.

FIG. 1 is a front perspective view of an exemplary embodiment of an electrical machine 1000, which can comprise and/or be comprised by a motor, generator, magnetic bearing, and/or switched reluctance machine, etc. Machine 1000 can comprise a rotor shaft 1100, a rotor 1200, a stator 1300, a number of poles 1400, and one or more coils 1500 mounted on and/or surrounding each pole 1400.

Figure 2:
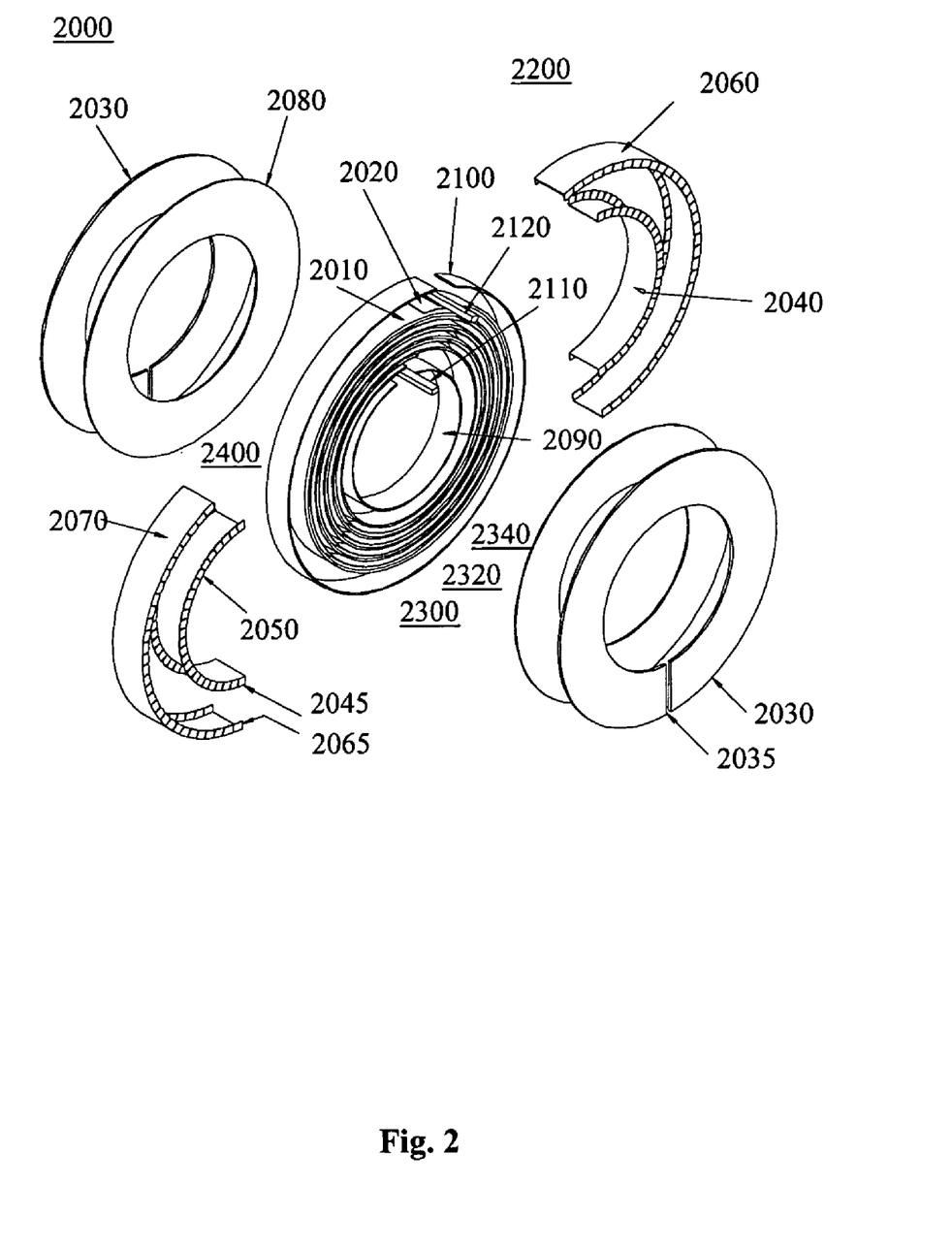
FIG. 2 is an assembly view of an exemplary embodiment of a coil 2000.
Figure 3:
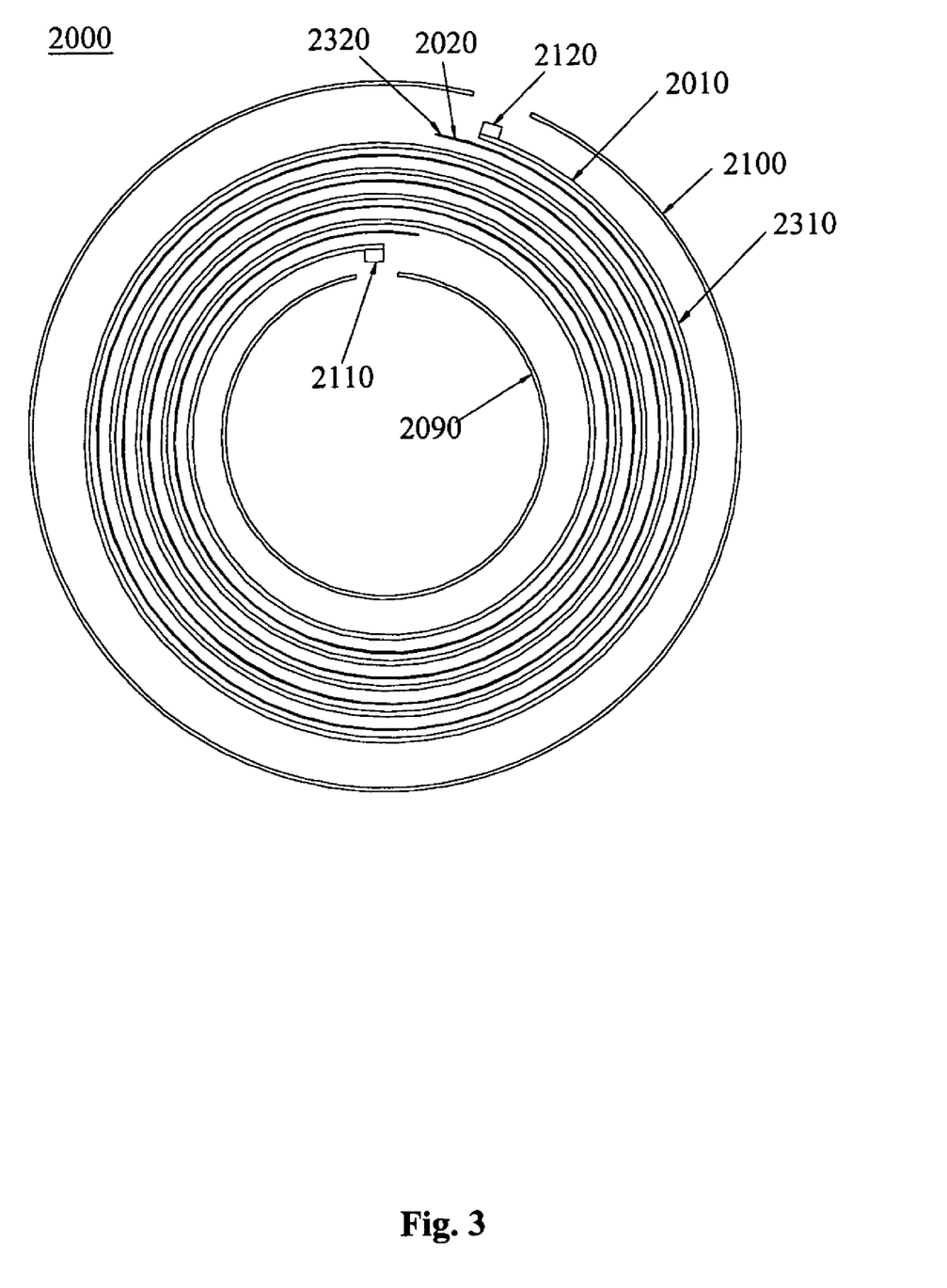
FIG. 3 is an end view of an exemplary embodiment of a coil 2000.
Figure 4:
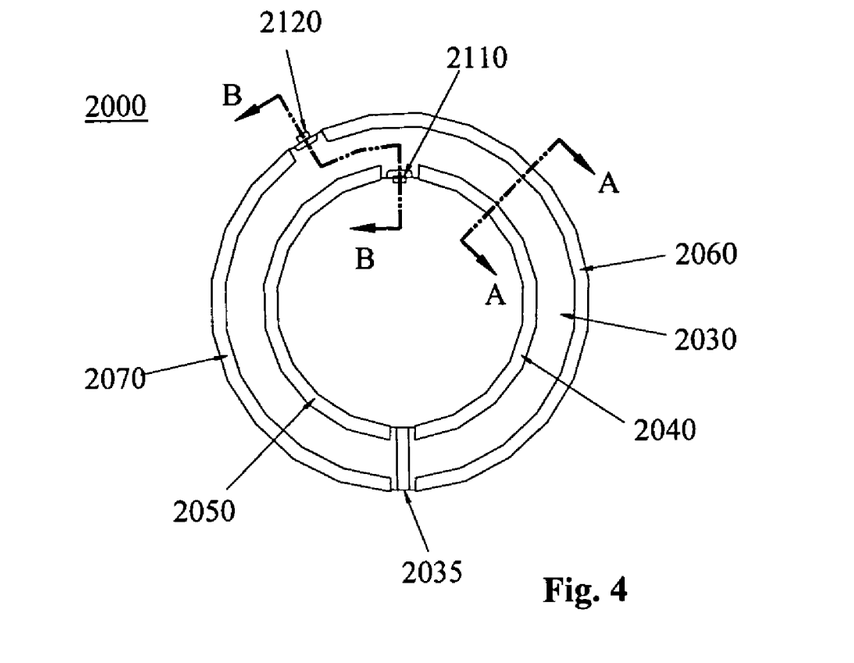
FIG. 4 is an end view of an exemplary embodiment of a coil 2000.
Figure 5:
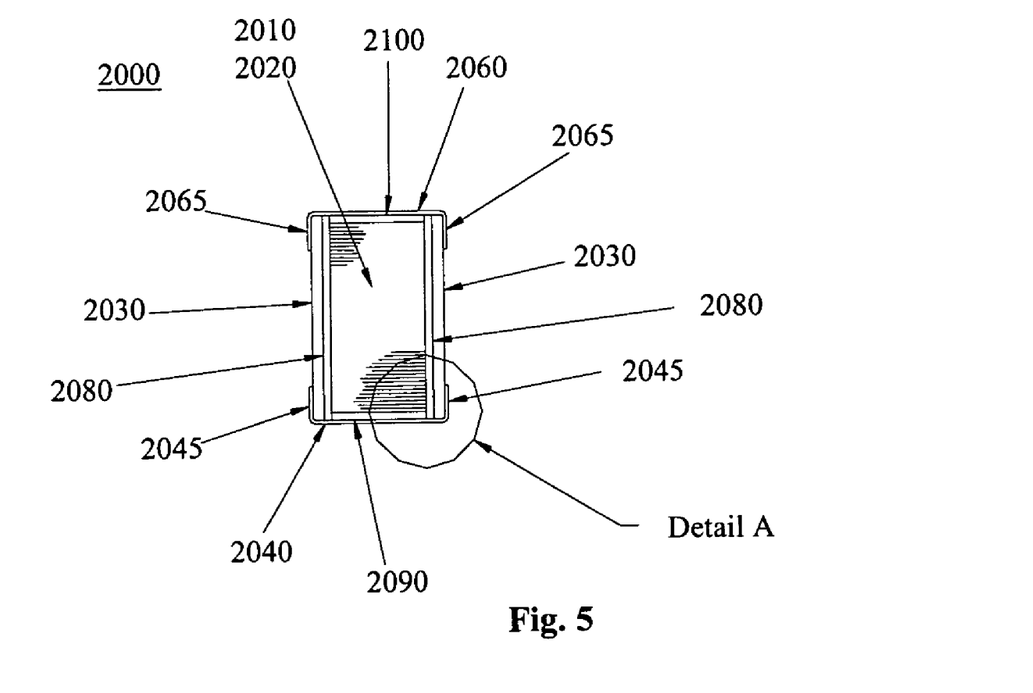
FIG. 5 is a sectional view taken at section A-A of FIG. 4.
Figure 7:
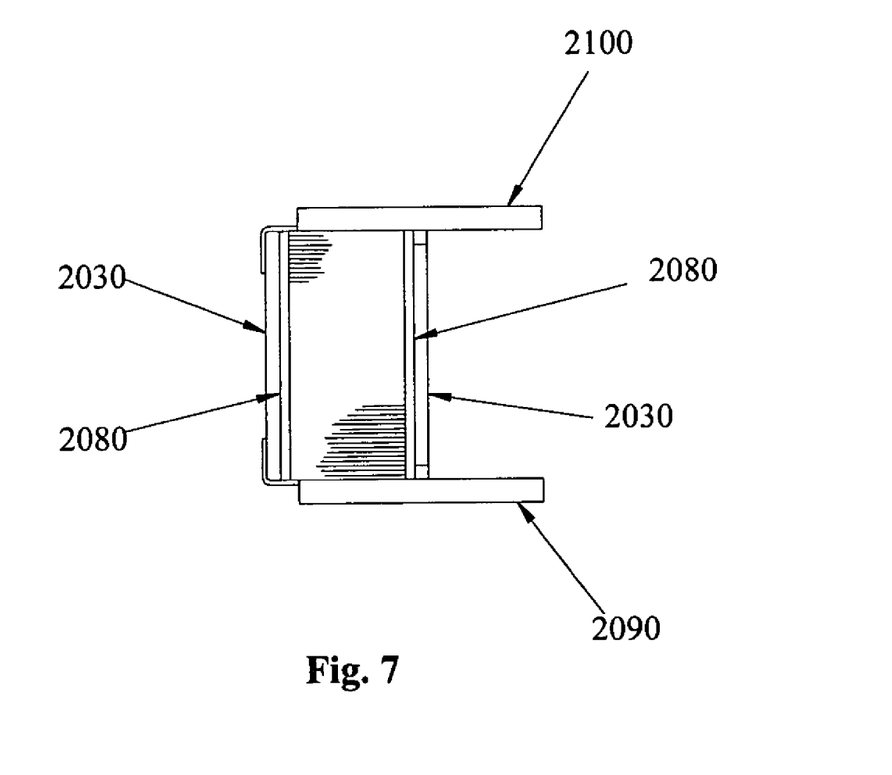
FIG. 7 is a sectional view taken at section B-B of FIG. 4.

FIG. 2 is an assembly view of an exemplary embodiment of a high temperature coil assembly 2000. FIG. 3 is an end view of an exemplary embodiment of a coil 2000. FIG. 4 is an end view of an exemplary embodiment of a coil 2000. FIG. 5 is a sectional view taken at section A-A of FIG. 4. FIG. 7 is a sectional view taken at section B-B of FIG. 4.

Referring to FIGS. 2, 3, 4, 5, and 7, certain exemplary embodiments of coil assembly 2000 can comprise one or more sets of flat wire 2010 windings 2300 that are wound in an outward spiral 2310 with one turn per layer (also referred to as a tape-wound coil 2400, which can be wound similar to a spiral torsion spring.) In addition, a tape 2020 can be wound in a parallel spiral 2320 and can serve as the turn-to-turn (layer-to-layer) insulation in coil 2000 assembly. Wire 2010 can be constructed of copper and/or silver measuring about 0.010 inches to about 0.020 inches in thickness, with a width to thickness aspect ratio ranging from about 10 to about 30. For high temperature corrosion and/or oxidation resistance, wire 2010 can be plated and/or clad with nickel, gold, silver, etc.

Tape 2020 can be constructed of phlogopite mica and/or fiberglass, and can range from about 0.004 inches to about 0.006 inches in thickness. Phlogopite mica can be an excellent electrical insulator that can be used at continuous service temperatures in excess of 10001F. Phlogopite mica/fiberglass tape has a dielectric strength of about 400 V/mil at temperatures up to approximately 650° F. Phlogopite mica can retain more than about 50% of its initial dielectric strength at about 1000° F.

Certain exemplary embodiments of coil assemblies of this design can take on either a circular profile (FIGS. 2-4) or a rectangular profile (FIG. 9) however the coil cross-section will typically be a rectangular shape (FIGS. 5-8.)

The windings can be encased in a shell 2200, which can be constructed of stainless steel. Shell 2200 can comprise shell side walls 2030, one on each side of the coil windings 2010, which can be about 0.010 inches to about 0.020 inches in thickness. Shell 2200 can comprise right and left halves of an inner surface shell 2040, 2050, and right and left halves of an outer surface shell 2060, 2070. Inner shell 2040, 2050 and outer shell 2060, 2070 are typically about 0.003 inches in thickness. These components can be bent and formed to follow the inner and outer profile of the shape of coil 2400, and can be attached to side walls 2030 by tabs and/or flanges 2045, 2065 that can be bent and/or spot welded to shell side walls 2030 in multiple locations around coil assembly 2000.

Shell 2200 can serve to provide mechanical and structural support, aiding the weaker coil windings 2300 to retain their intended shape. Shell 2200 can act to mechanically contain and support insulators 2080, 2090, 2100 to counteract vibration and thermal cycling. Shell 2200 can provide a durable and tough outer surface (much tougher than insulators 2080, 2090, 2100 used to surround coil 2400), thereby protecting coil 2400 from external abrasion, forces, impacts, and/or abuse.

Shell 2200 can provide a small radial gap 2035 through shell side wall 2030 in one angular location to prevent a single continuous circumferential electrical path ("a shorted turn") from being formed. This can be useful in cases where the coil assembly 2000 conducts an alternating current, such as for motors, generators, and/or magnetic bearings.

Windings 2300 can be totally surrounded by insulators 2080, 2090, 2100, which can be formed of phlogopite mica. Windings 2300 can be insulated from shell side walls 2030 by side wall insulator 2080, which can be made of rigid phlogopite mica plate, which can be about 0.012 inches to about 0.016 inches in thickness.

Windings 2300 can be insulated from inner shell surface 2040, 2050 by inner surface insulator 2090. Windings 2300 can be insulated from outer shell surface 2060, 2070 by outer surface insulator 2100. Inner surface insulator 2090 and/or outer surface insulator 2100 can be made of flexible phlogopite mica sheet, which can be about 0.012 inches to about 0.016 inches in thickness.

To allow for external electrical connections to be made to the individual sets of windings 2300 a starting lead bar 2110, which can be made of stainless steel and/or plated copper, can be spot welded onto wire 2010 at the beginning of the first turn, perpendicular to wire 2010. At the conclusion of winding 2300, an ending lead bar 2120 can be spot welded to wire 2010 at the end of the last turn, perpendicular to wire 2010. Sufficient clearances and breaks can be provided in shell 2200 in the region surrounding each lead bar 2110, 2120, to prevent shell 2200 from making contact with the lead bars, 2110, 2120. Insulators (not shown), which can be made of mica sheet, mica plate, and/or ceramic, can be used to prevent lead bars 2110, 2120, from making contact with shell 2200 and/or the adjacent coil windings 2300.

High temperature pottings, coatings, and/or encapsulants can be applied to coil assembly 2000 during the actual winding of the coil 2300 (via "wet winding") and/or after coil 2300 is fully assembled (via vacuum impregnation) to 1) seal coil 2300 from moisture, 2) provide additional corrosion protection to the wire 2010, and/or 3) mechanically stabilize and/or augment the insulating characteristics of insulators 2080, 2090, 2100.

Figure 6:
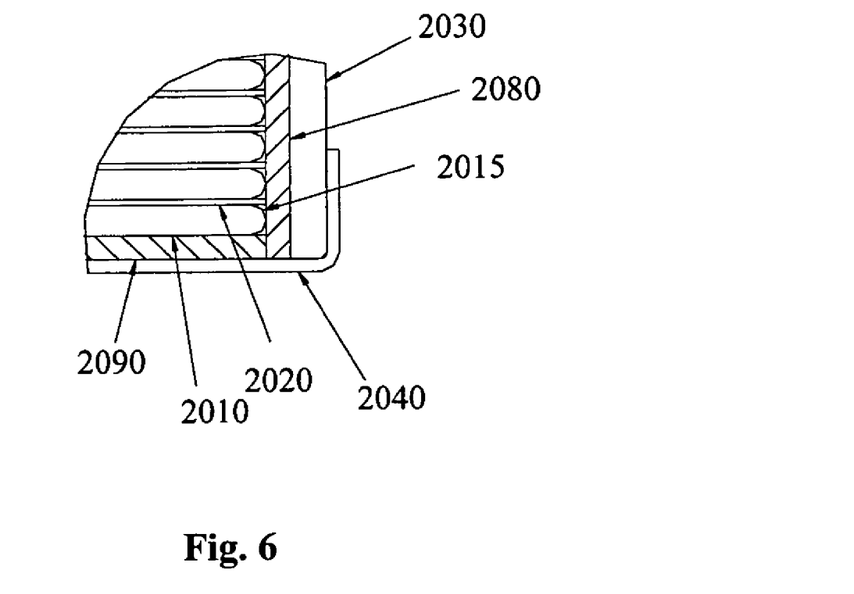
FIG. 6 is a detail view taken at detail A of FIG. 5.

FIG. 6 is a detail view taken at detail A of FIG. 5. The edges of the flat wire 2010 can have edges 2015 that are fully rounded to prevent burrs and/or sharp edges from creating turn-to-turn contact (i.e., a turn-to-turn short circuit).

Figure 8:
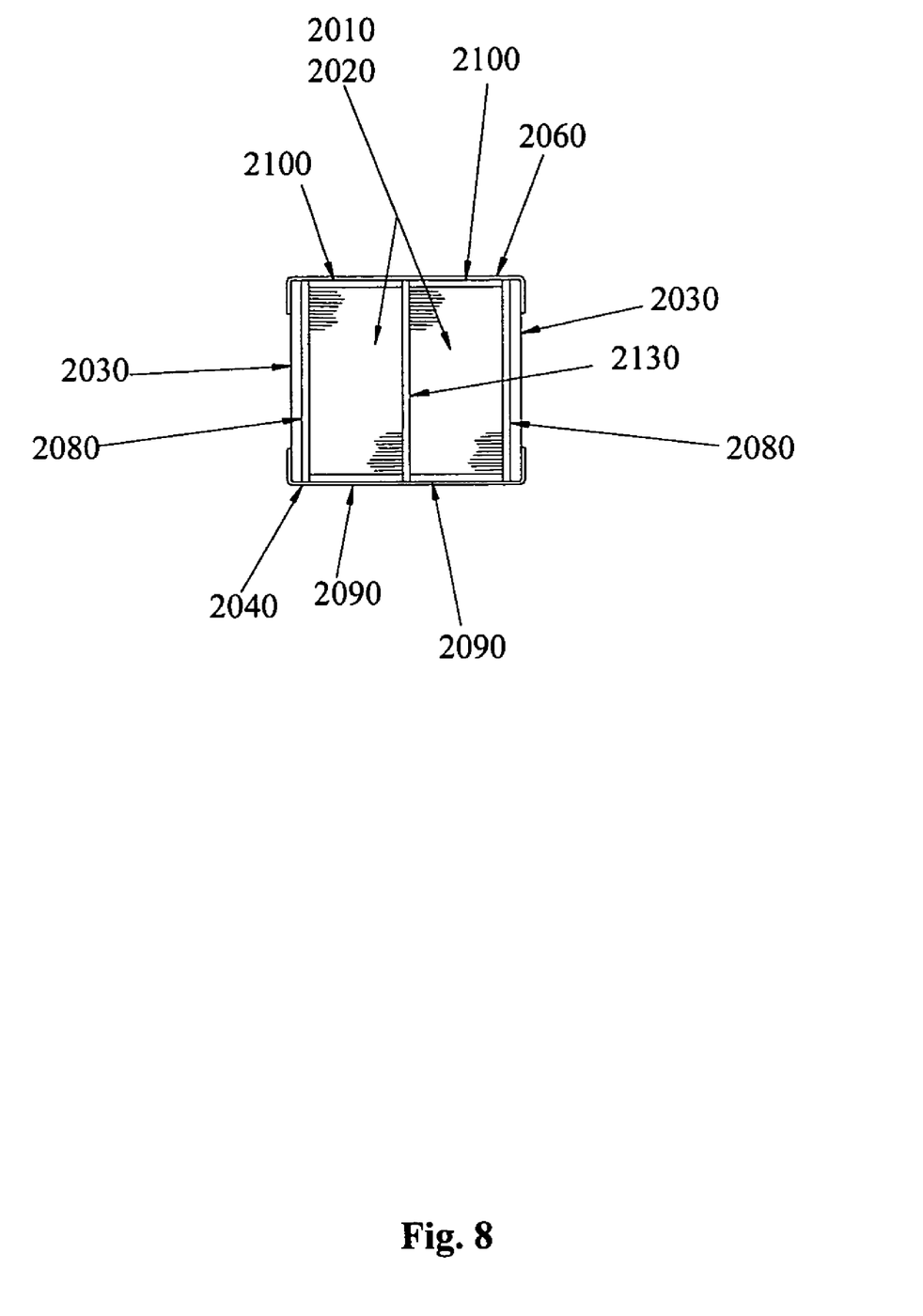
FIG. 8 is an alternative embodiment of a sectional view taken at section A-A of FIG. 4.

FIG. 8 is an alternative embodiment of a sectional view taken at section A-A of FIG. 4. When more than one set of windings 2300 are encased in a single shell 2200, the separate sets of windings can be insulated from each other by winding insulator 2130, which can be made of rigid phlogopite mica plate, which can be about 0.008" to about 0.012" in thickness.

Figure 9:
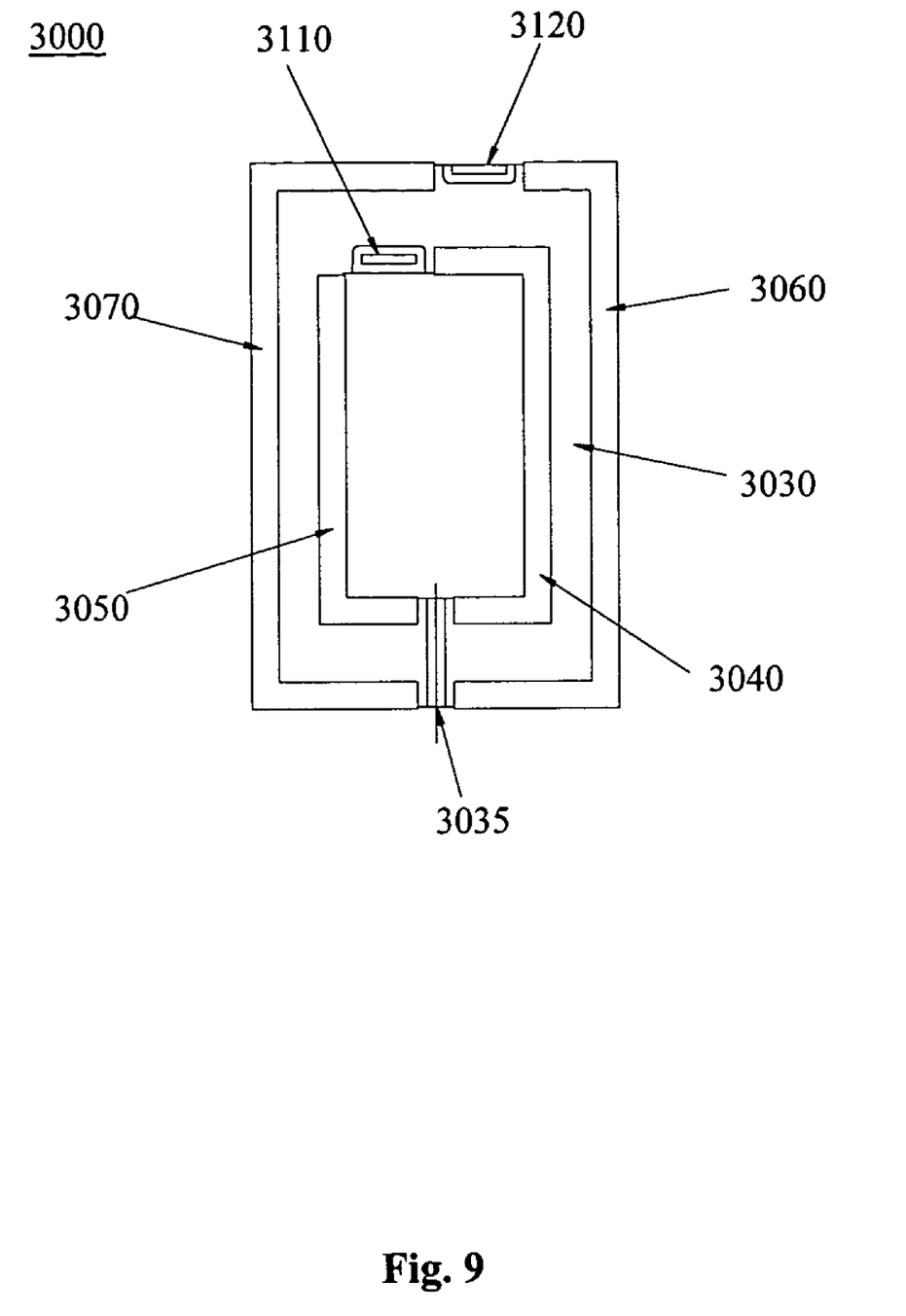
FIG. 9 is an end view of an exemplary embodiment of a coil 3000.

FIG. 9 is an end view of an exemplary embodiment of a coil 3000, which has an annular rectangular shape. Shown are annular rectangular shell side wall 3030; gap 3035; perpendicularly-cornered inner shell surface 3040, 3050; perpendicularly-cornered outer shell surface 3060, 3070; starting lead bar 3110; and ending lead bar 3120.

Certain exemplary embodiments were tested via thermal cycling. After 8 cycles between approximately 70 degrees F. and approximately 1000 degrees F., the measured resistance between a tested coil assembly's conductor (i.e., wire and/or lead bars) and ground was greater than 30 M-ohms (the full scale reading of the instrument). After 3 cycles between approximately 800 degrees F. and approximately 77 degrees K (−321 degrees F.), performed by heating the coil assembly and then plunging it into liquid nitrogen, the measured resistance between a tested coil assembly's conductor and ground was greater than 30 M-ohms (the full scale reading of the instrument).

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. An apparatus, comprising:
   an electrical coil adapted for use in an electromagnetic machine and adapted for a continuous operating temperature exceeding approximately 1000 degrees F., said coil comprising:
      a copper winding wound about a central axis in a first spiral, said winding defining a winding width and a winding thickness, a ratio of said winding width to said winding thickness ranging from approximately 10 to approximately 30;
      a phlogopite mica/fiberglass tape wound about the central axis in a second spiral, said tape defining a tape width and a tape thickness, said tape located width-wise adjacent said winding; and
      a stainless steel shell encasing said first spiral and said second spiral, said shell comprising:
         an inner shell portion located proximate to and surrounding the central axis;
         an outer shell portion located distal to and surrounding the central axis; and
         an opposing pair of shell side portions each located substantially in a respective plane perpendicular to the central axis; and
      a phlogopite mica winding insulator separating said winding from said shell, said winding insulator comprising:
         a flexible inner portion insulator located between said winding and said inner shell portion;
         a flexible outer portion insulator located between said winding and said outer shell portion; and
         a rigid opposing pair of side portion insulators each located between a respective shell side portion and said winding.

2. An apparatus, comprising:
   a high temperature electrical coil adapted to transfer rotational energy to or from a rotor of an electromagnetic machine or to support said rotor of said electromagnetic machine, comprising:
      a first electrically conductive winding wound about a central axis in a first spiral, said first winding defining a first winding width and a first winding thickness, a ratio of said first winding width to said first winding thickness greater than approximately 10;
      a first electrically insulating tape wound about the central axis in a second spiral, said first tape defining a first tape width and a first tape thickness, said first tape located width-wise adjacent said first winding; and
      a corrosion-resistant shell encasing said first spiral and said second spiral.

3. The apparatus of claim 2, wherein said first winding comprises copper.

4. The apparatus of claim 2, wherein said first winding comprises plated copper.

5. The apparatus of claim 2, wherein said first winding comprises clad copper.

6. The apparatus of claim 2, wherein said first winding comprises silver.

7. The apparatus of claim 2, wherein said first winding thickness is from approximately 0.005 inches to approximately 0.030 inches.

8. The apparatus of claim 2, wherein said first winding defines opposing rounded edges.

9. The apparatus of claim 2, wherein said first tape comprises mica.

10. The apparatus of claim 2, wherein said first tape comprises phlogopite mica.

11. The apparatus of claim 2, wherein said first tape thickness is from approximately 0.003 inches to approximately 0.008 inches.

12. The apparatus of claim 2, wherein said shell comprises stainless steel.

13. The apparatus of claim 2, wherein said shell defines a radial gap through said shell.

14. The apparatus of claim 2, further comprising a mica insulator located between said first winding and said shell.

15. The apparatus of claim 2, further comprising an electrical terminal coupled to said first winding.

16. The apparatus of claim 2, further comprising an electrical terminal coupled to said first winding and insulated from said shell.

17. The apparatus of claim 2, further comprising a second winding axially separated from said first winding by insulation and encased within said shell.

18. The apparatus of claim 2, wherein said coil is designed for a continuous operating temperature exceeding approximately 1000 degrees F.

19. The apparatus of claim 2, further comprising an electromagnetic machine component at least partially surrounding said coil.

20. The apparatus of claim 2, further comprising the electromagnetic machine at least partially surrounding said coil.

21. The apparatus of claim 2, further comprising a magnetic bearing at least partially surrounding said coil.

22. The apparatus of claim 2, further comprising a motor at least partially surrounding said coil.

23. The apparatus of claim 2, further comprising a generator at least partially surrounding said coil.

24. A method, comprising a plurality of activities, comprising:
   obtaining an electromagnetic machine comprising:
      a high temperature electrical coil adapted to transfer rotational energy to or from a rotor of said electromagnetic machine or to support said rotor of said electromagnetic machine, comprising:
         a first electrically conductive winding wound about a central axis in a first spiral, said first winding defining a first winding width and a first winding thickness, a ratio of said first winding width to said first winding thickness greater than approximately 10;
         a first electrically insulating tape wound about the central axis in a second spiral, said first tape defining a first tape width and a first tape thickness, said first tape located width-wise adjacent said first winding; and
         a corrosion-resistant shell encasing said first spiral and said second spiral; and
   operating the coil at a continuous temperature exceeding approximately 1000 degrees F.

* * * * *

UNITED STATES PATENT AND TRADEMARK OFFICE
CERTIFICATE OF CORRECTION

| | | |
|---|---|---|
| PATENT NO. | : 7,250,704 B1 | Page 1 of 1 |
| APPLICATION NO. | : 10/912955 | |
| DATED | : July 31, 2007 | |
| INVENTOR(S) | : Sortore et al. | |

It is certified that error appears in the above-identified patent and that said Letters Patent is hereby corrected as shown below:

Col. 3, line 13, "10001F" should read --1000° F--.

Signed and Sealed this

Twenty-eighth Day of April, 2009

JOHN DOLL
*Acting Director of the United States Patent and Trademark Office*